United States Patent
Michel

(10) Patent No.: US 6,920,941 B2
(45) Date of Patent: Jul. 26, 2005

(54) ADJUSTABLE GRASS TREATMENT APPARATUS

(76) Inventor: David Michel, Manor Farm, Otley Road, Adel, Leeds (GB), LS16 7AL ( * ) Notice: Subject to any disclaimer, the term of this patent is extended or adjusted under 35 U.S.C. 154(b) by 0 days.

(21) Appl. No.: 10/422,641

(22) Filed: Apr. 24, 2003

(65) Prior Publication Data

US 2003/0226915 A1 Dec. 11, 2003

(30) Foreign Application Priority Data

Apr. 24, 2002 (GB) .............................. 0209286

(51) Int. Cl.$^7$ ............................................. A01B 73/00
(52) U.S. Cl. ........................................ 172/446; 111/57
(58) Field of Search ................ 172/311, 446, 172/456, 457, 459; 111/57

(56) References Cited

U.S. PATENT DOCUMENTS

| | | | | |
|---|---|---|---|---|
| 3,463,240 A | | 8/1969 | Macaro | |
| 3,606,848 A | * | 9/1971 | Fullerton | 111/57 |
| 4,350,211 A | * | 9/1982 | Coufal | 172/311 |
| 4,355,690 A | * | 10/1982 | Jensen et al. | 172/311 |
| 4,360,215 A | * | 11/1982 | Nohl et al. | 280/413 |
| 4,364,581 A | * | 12/1982 | Shoup | 172/311 |
| 4,496,004 A | * | 1/1985 | Frase et al. | 172/311 |
| 4,576,238 A | * | 3/1986 | Spencer | 172/311 |
| 4,615,397 A | * | 10/1986 | Hastings | 172/776 |
| 4,619,330 A | * | 10/1986 | Machnee | 172/311 |
| 4,721,168 A | * | 1/1988 | Kinzenbaw | 172/311 |
| 4,881,603 A | * | 11/1989 | Hartman | 172/311 |
| 5,253,717 A | * | 10/1993 | Roush et al. | 172/311 |
| 5,261,497 A | * | 11/1993 | Snyder et al. | 172/313 |
| 5,265,898 A | * | 11/1993 | Houck | 280/413 |
| 5,833,013 A | | 11/1998 | Davis | |
| 5,883,013 A | * | 3/1999 | Noguchi et al. | 438/780 |
| 6,119,788 A | * | 9/2000 | Bernier | 172/311 |
| 6,408,950 B1 | * | 6/2002 | Shoup | 172/311 |

FOREIGN PATENT DOCUMENTS

| | | |
|---|---|---|
| DE | 8712640 | 11/1987 |
| DE | 3734933 | 6/1988 |
| GB | 1459594 | 3/1973 |

* cited by examiner

Primary Examiner—Thomas B. Will
Assistant Examiner—Alexandra Pechhold
(74) Attorney, Agent, or Firm—Madson & Metcalf

(57) ABSTRACT

A grass treatment apparatus is adapted to be coupled with a propellant vehicle in order to be movable over the ground and which mounts a plurality of grass treatment units which are engageable with the ground in order to carry out required grass treatment operations. The apparatus includes a main frame having mountings for coupling to the propelling vehicle and a grass treatment unit mounted on the main frame. A side frame is adjustably mounted on the main frame and has a grass treatment unit mounted thereon. The main frame has a mounting recess for receiving the side frame. A power operated device couples the side frame to the main frame and adjusts the side frame between an outwardly deployed position in which it is laterally spaced from the main frame and an inwardly deployed position in which the side frame is received by the mounting recess.

20 Claims, 6 Drawing Sheets

ADJUSTABLE GRASS TREATMENT APPARATUS

BACKGROUND OF THE INVENTION

This invention relates generally to a grass treatment apparatus which is adapted to be coupled with a propelling vehicle and to be moveable over the ground so that grass treatment devices provided on the apparatus can carry out any required grass treatment.

In particular, the invention is specifically concerned with an adjustable grass treatment apparatus, in which at least some of the grass treatment devices are adjustable between two different working positions, in order to allow the overall working width of the apparatus to be adjusted (with respect to the direction of forward travel). When, as is preferred, the invention is applied to a multiple brush unit type of grass treatment apparatus, the apparatus can be converted to operate in a reduced width mode, or an extended width mode as required. In the reduced width mode, a number of brush units can be arranged one behind the other so as to apply an aggressive working action by the successive brush units over the reduced width, whereas in the extended width mode at least some of the brush units are adjusted to a laterally displaced position so that a greater width of grass can be treated during one pass of the apparatus, but in a less aggressive manner.

It is known to provide multiple brush unit brush head type apparatus which are used in particular in the treatment of large areas of grass, such as sports fields and golf courses, in which "top dressing" material is worked into the grass surface, and often after previous spiking or hollow tine aeration of the ground. In some circumstances, an aggressive working action is required, and therefore the apparatus is adjusted to the reduced width mode with a succession of brush units arranged one behind the other, whereby a considerable number of separate working actions may be applied during each pass of the apparatus.

Alternatively, when a less aggressive working action will be sufficient, the apparatus can be adjusted to the extended width mode, in which a smaller number of working actions take place over each area of the grass being treated, but over a greater width.

However, in the known apparatus, a brush unit e.g. a single brush head, or a bank of brush heads, is manually adjusted between a laterally extended position and a reduced width position. To this end, a central frame is provided, having one or more brush units permanently mounted therein, and separate "wing" frames (each with a brush unit) are connected to the central frame and extend outwardly thereof in the extended position. However, the wing frames can be manually detached from the central frame, and then manually mounted in receiving spaces defined in the central frame to provide the reduced width mode.

Clearly, the requirement to carry out manual adjustment of the brush units, in known machines, is time consuming and arduous, and which is particularly disadvantageous for a user who may require to adjust the brushing width quite frequently during a typical treatment operation. It would therefore be technically and commercially advantageous to develop an automated system, and which is one preferred need addressed by the present invention.

BRIEF SUMMARY OF THE INVENTION

Accordingly, the present invention provides a grass treatment apparatus which is adapted to be coupled with a propelling vehicle in order to be movable over the ground and which mounts a plurality of grass treatment units which are engageable with the ground in order to carry out required treatment operations, said apparatus comprising:

a main frame having mountings by which the apparatus can be coupled with a propelling vehicle;

a grass treatment unit mounted on the main frame;

a side frame adjustably mounted on the main frame, and having a grass treatment unit mounted thereon;

a mounting recess provided in the main frame for receiving the side frame; and a power-operated device coupling the side frame to the main frame and operative to adjust the side frame between an outwardly deployed position in which it is laterally spaced from the main frame so that the treatment units can operate throughout an extended width provided by the main frame and the side frame lying one beside the other, and an inwardly deployed position in which the side frame is received by said mounting recess so that the treatment units are located one behind the other and operate throughout a reduced width provided by the main frame only.

The invention therefore provides an automated apparatus which can quickly and easily be adjusted between a reduced width operating mode and an extended width operating mode.

The power operated device may take any convenient form, such as a piston/cylinder device, and may have a two part coupling with the side frame such that the side frame maintains a substantially horizontal attitude as it is adjusted between its two different operating positions. This means that when, as per one preferred embodiment, each treatment unit takes the form of a brush unit, the bristles of the brush unit will face downwardly towards the grass surface throughout adjustment movement and when the frame reaches its final position.

Conveniently, to facilitate guidance of the frame to the inwardly deployed position, received by the mounting recess, an inclined guide ramp may be mounted in the main frame and in the path of movement of the side frame, to guide its final movement to the inwardly deployed position.

The side frame is preferably suspended via a substantially horizontal pivot which extends parallel to the direction of forward travel, and which allows limited pivoting movement of the side frame about the pivot. This allows the side frame to follow the contour of the ground, in either of its working positions, and independently of the main frame, whereby the associated treatment unit of the side frame can remain in working contact with the grass surface, even in the event of lateral undulation in the grass surface.

Preferably, two side frames are provided, each of which is outwardly adjustable relative to the main frame, to form a side "wing" section, and longitudinally spaced mounting recesses may be provided in the main frame each to receive a respective wing section when in the inwardly deployed position.

When the treatment units take the form of brush units, they may comprise longitudinal brush strips and/or parallel arrangements of brush heads having their axes extending obliquely of the direction of forward travel.

While the preferred grass treatment unit adopted in apparatus according to the invention comprise brush units, it should be understood that the invention has application to apparatus having different types of grass treatment devices mounted thereon. By way of example only, the grass treatment devices may comprise roller units.

BRIEF DESCRIPTION OF THE SEVERAL VIEWS OF THE DRAWINGS

A preferred embodiment of adjustable grass treatment apparatus according to the invention will now be described in detail, by way of example only, with reference to FIG. 1 of the accompanying drawings, which is a schematic plan view of the apparatus.

DETAILED DESCRIPTION OF THE INVENTION

Figure 1:
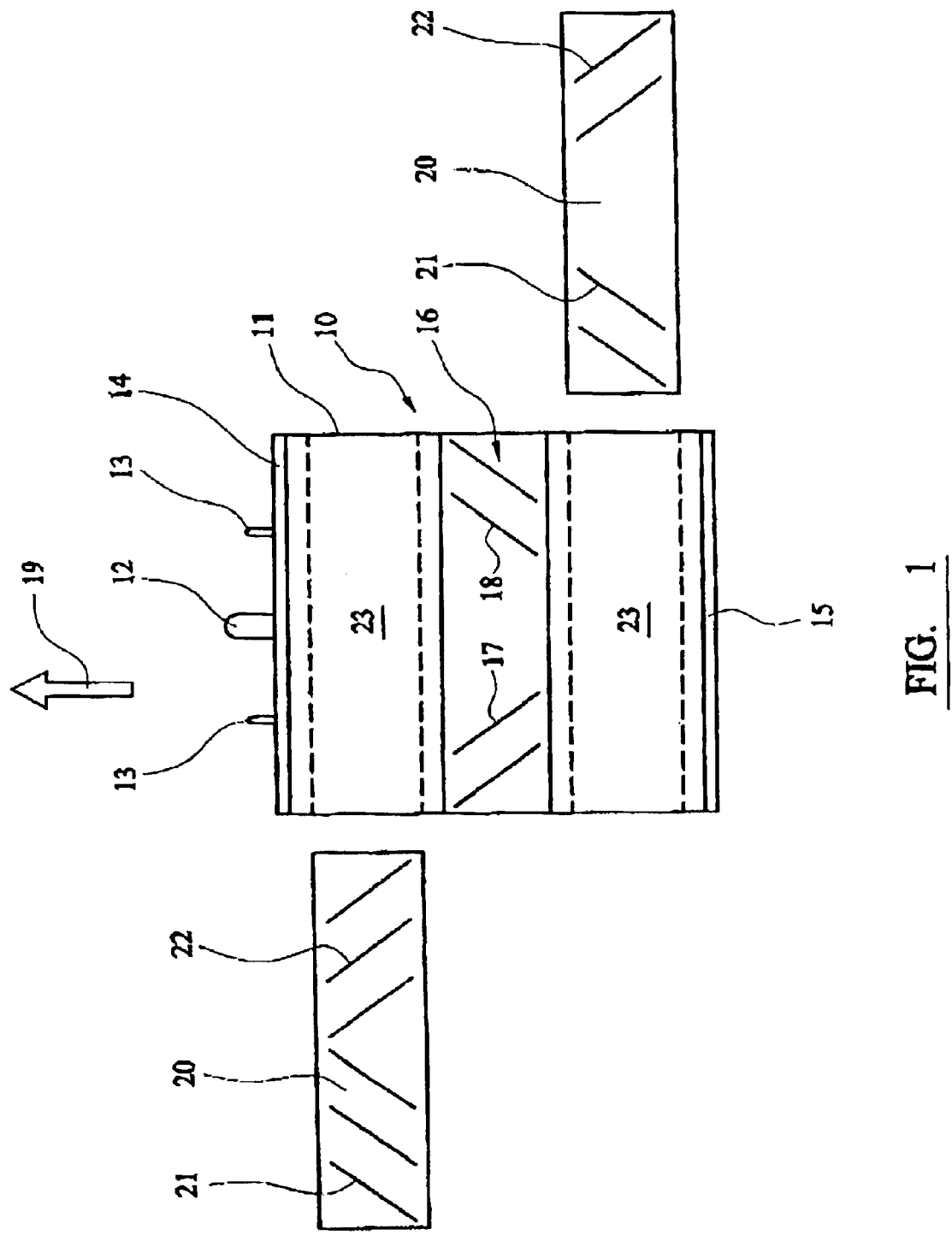
Figure 2:
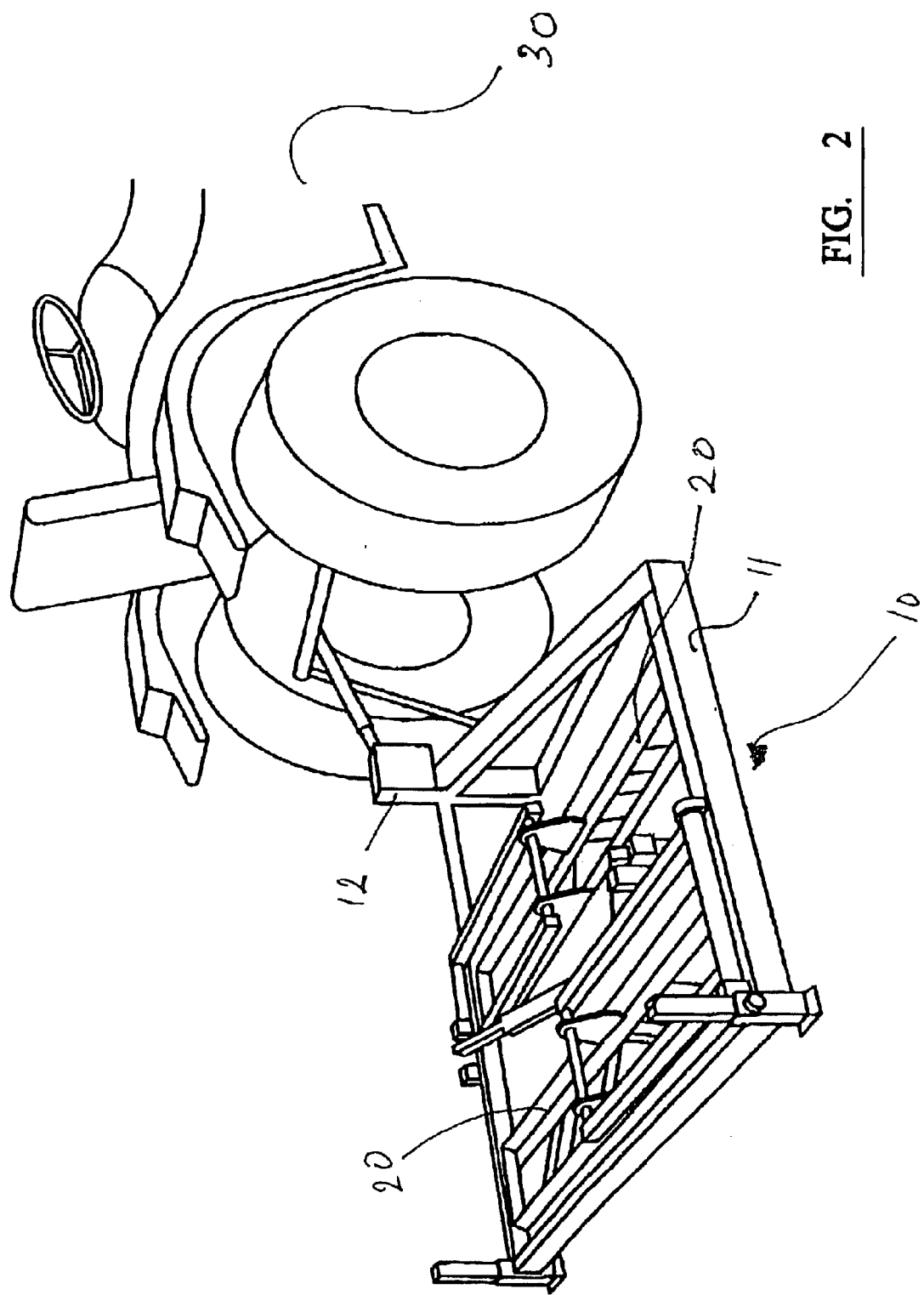
FIGS. 2 to 6 are perspective illustrations, from different aspects, and showing different operating modes of the apparatus.
Figure 3:
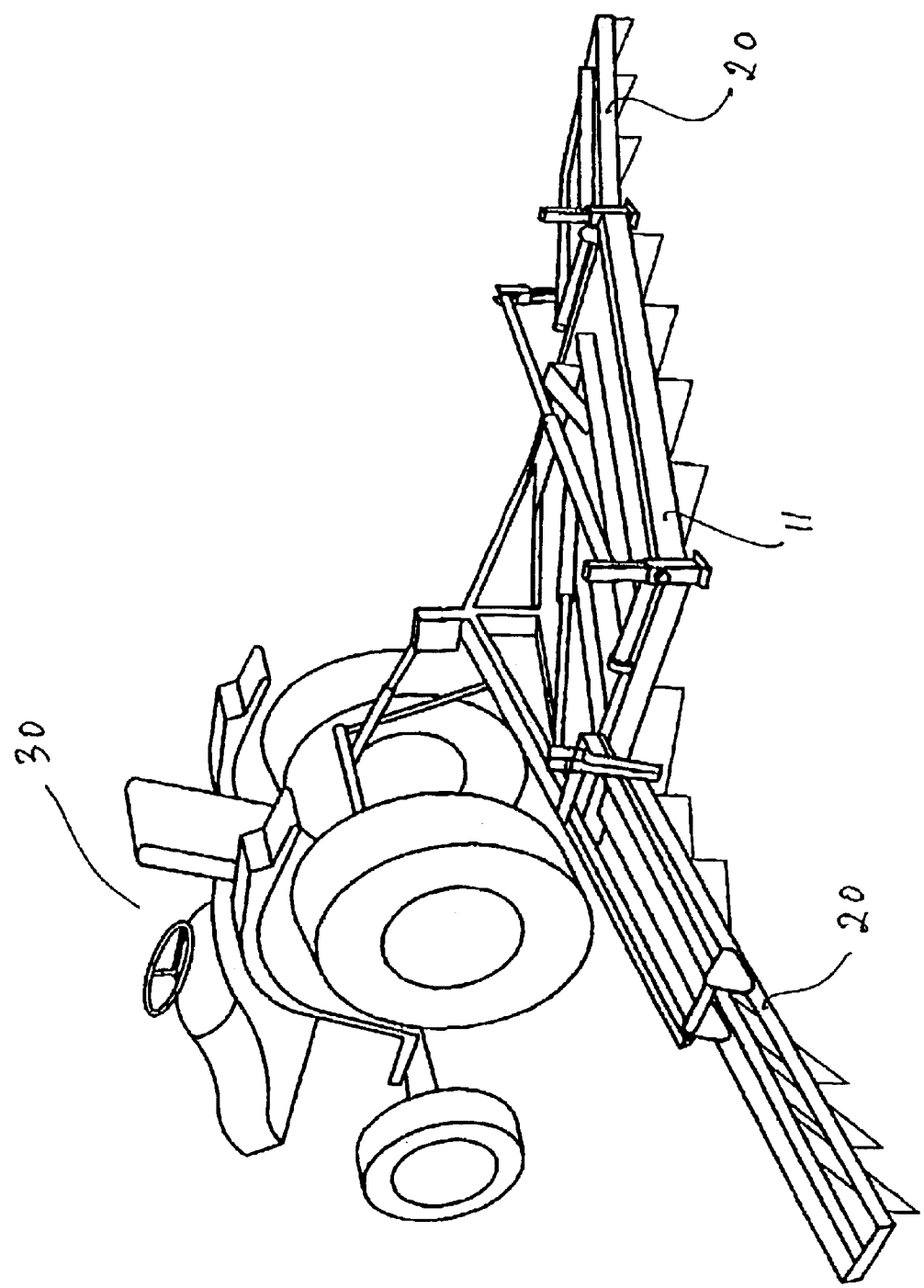
Figure 4:
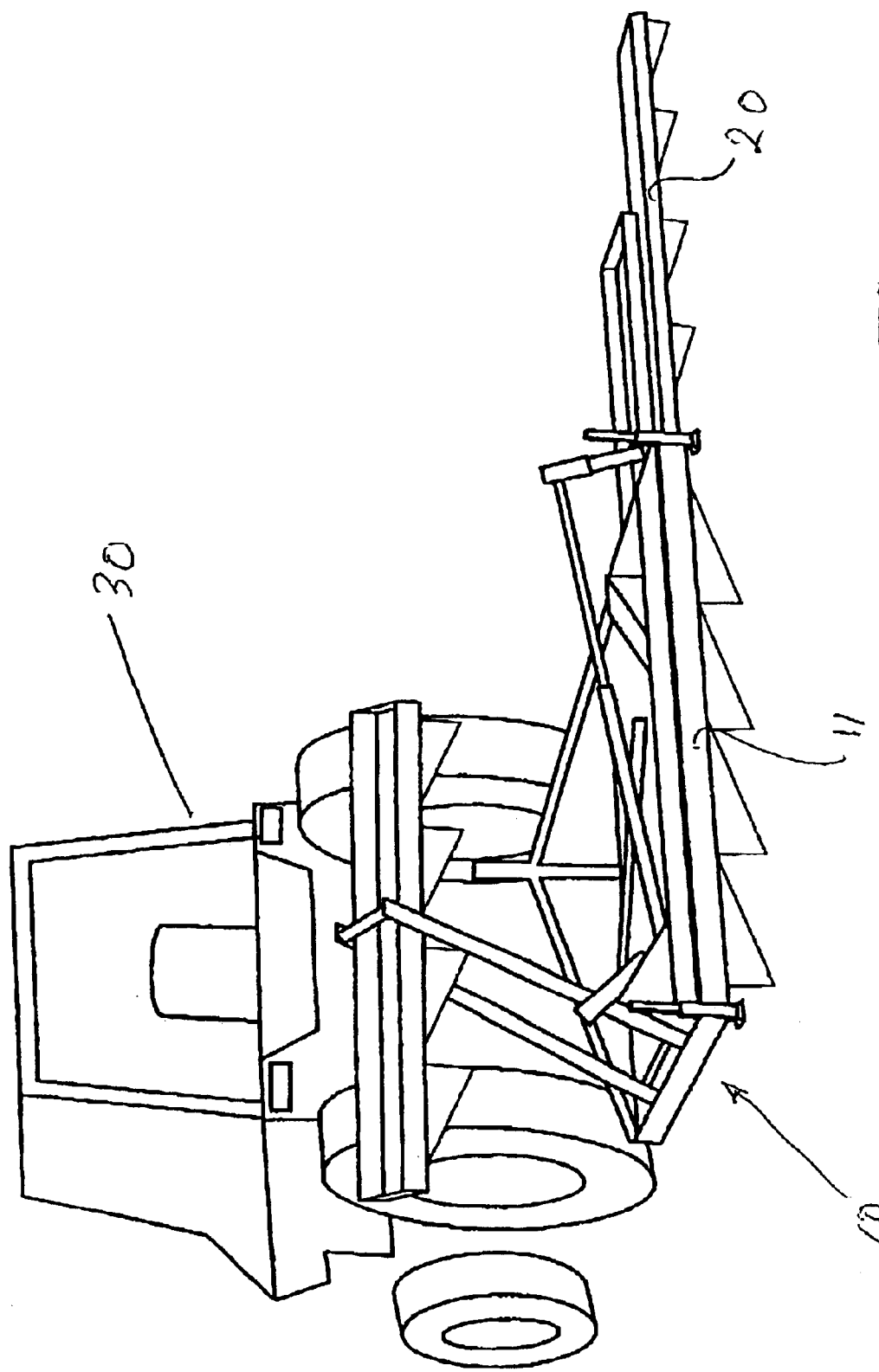
Figure 5:
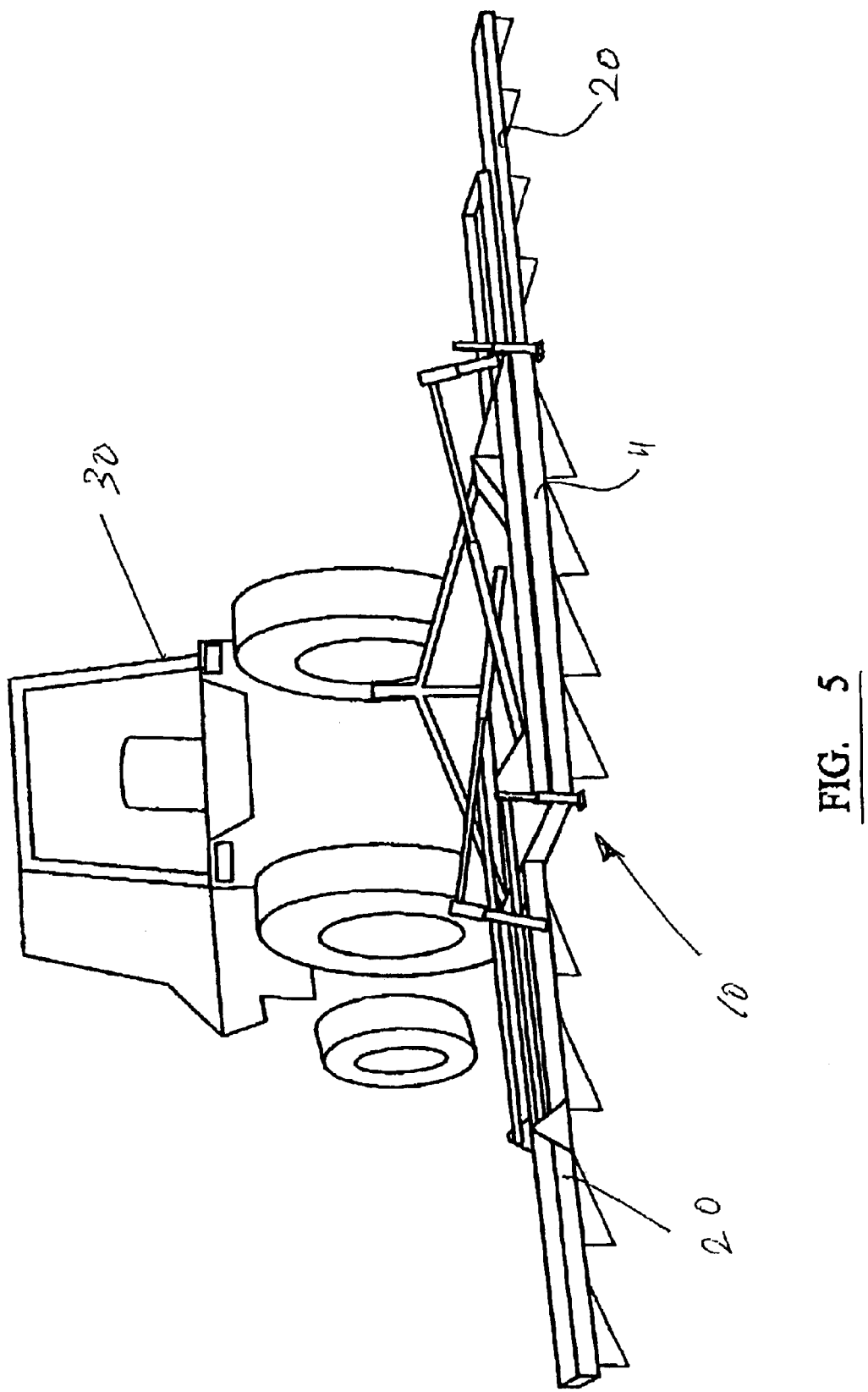
Figure 6:
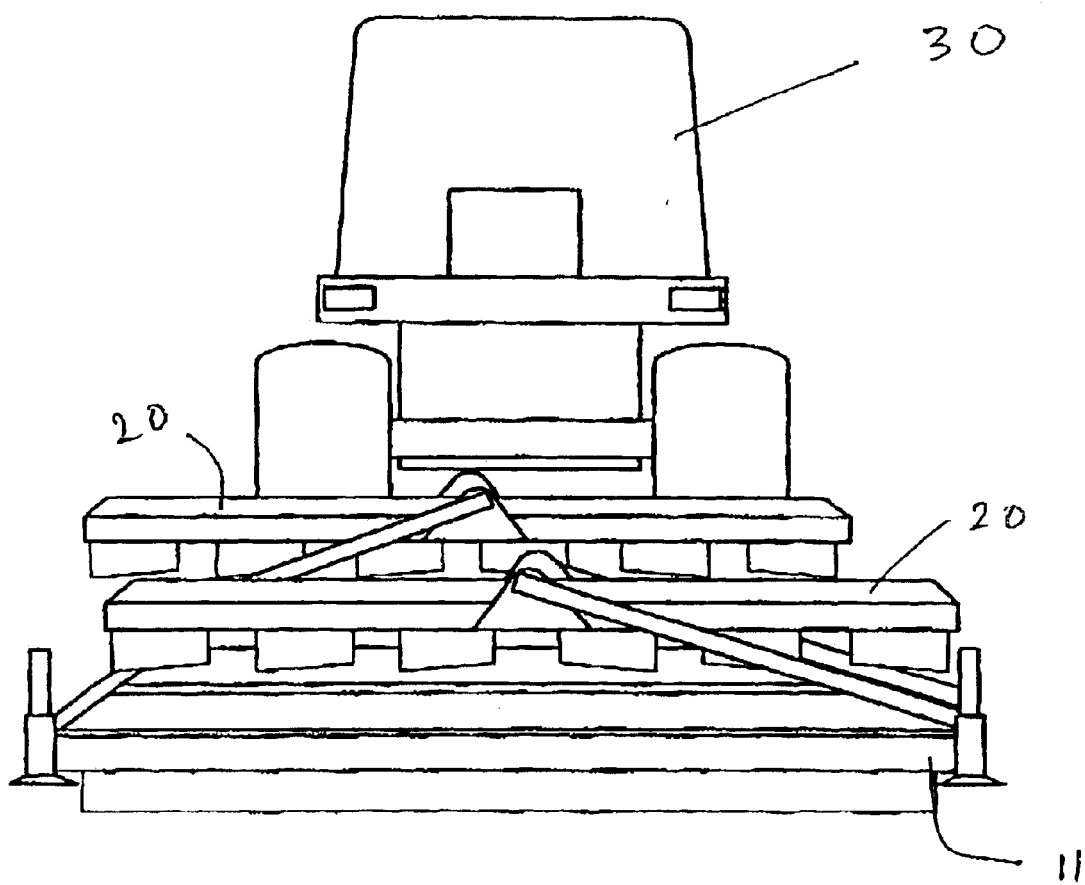

Referring now to the drawing, an adjustable grass treatment apparatus according to the invention is designated generally by reference 10 and is adapted to be coupled with a propelling vehicle, in order to be movable over the ground, and which mounts a plurality of grass treatment units which are engageable with the ground in order to carry out required grass treatment operations.

The apparatus 10 has a central or main frame 11 having forward mountings 12 and 13, which enable the apparatus 10 to be mounted on a usual three point hitch provided at the rear of a tractor or other propelling vehicle. Alternatively, the apparatus may be provided with wheeled support (not shown) and can be towed behind a tractor. Still further, the apparatus may be adapted to be front mounted on a tractor.

At least one grass treatment unit is permanently mounted on the main frame 11, and in the illustrated embodiment, three permanent grass treatment units are provided, which take the form of a forward brush strip 14, a rearward brush strip 15, and a central brush unit 16 located midway between the front and rear brush strips 14, 15, and comprising obliquely extending brush strips 17 and 18, which are oppositely inclined relative to the longitudinal axis of the apparatus. Arrow 19 shows the normal direction of forward travel of the apparatus during grass treatment operations.

In addition to the central frame 11, the apparatus 10 also has at least one side frame adjustably mounted on the main frame 11, and also having a grass treatment unit mounted thereon. In the illustrated embodiment, a pair of side frames 20 are provided, which effectively form side "wing" sections when they occupy an outwardly deployed position as shown in the drawings. Each side frame 20 has at least one grass treatment unit mounted thereon, and in the illustrated arrangement taking the form of obliquely extending brush strips 21 and 22, extending oppositely with respect to the longitudinal axis.

A mounting recess 23 is provided in the main frame 11, for receiving each side frame 20 and the drawing shows in dashed outline the positions taken-up by the side frames 20 when they are adjusted to take-up the inwardly deployed positions.

Although not shown, a power operated device is provided which couples each side frame 20 to the main frame 11, and which is operative to adjust the side frame 20 between the outwardly deployed position shown in full lines (in which it is laterally spaced from the main frame 11, so that the treatment units can operate throughout an extended width provided by the main frame 11 and the side frame(s) 20 lying one beside the other), and an inwardly deployed position, shown in dashed outline, in which each side frame 20 is received by the mounting recess 23 so that the treatment units are located one behind the other and operative throughout a reduced width provided by the main frame 11 only.

Each power operated device may take any convenient form, such as a piston/cylinder device, and having a two-part coupling (a double pivot or toggle linkage) with the side frame 20 such that the side frame maintains a substantially horizontal attitude as it is adjusted between its two different operating positions. This means that, when each treatment unit takes the form of a brush unit, the bristles of the brush unit will face downwardly towards the grass surface throughout adjustment movement and when the frame reaches its final position. Inclined guide ramps (not shown) are provided in the frame 11, to guide the final movement of the side frames 20 to the inwardly deployed positions.

Each side frame 20 is suspended via a substantially horizontal pivot which extends parallel to the direction of forward travel, and which allows limited pivoting movement of the frame 20 about the pivot. This allows the side frame to follow the contour of the ground, in either operating position, independently of the main frame 11, whereby the associated treatment unit can remain in working contact with the grass surface, even in the event of lateral undulations in the grass surface. Preferably, ballast is provided on each side frame to bias the frame downwardly.

It should be understood that, while brush units comprise one preferred embodiment of grass treatment unit to be provided in apparatus according to the invention, other types of grass treatment unit may be provided. By way of example, the main frame 11 may be provided with one or more transversely extending roller unit e.g. sarel (spiked) rollers, permanently mounted therein, and each side frame 20 may mount at least one roller unit also, and the roller units can operate on a reduced width basis with concentrated action, or an extended width basis with less concentrated action, generally similarly to that described above for the brush units.

What is claimed is:

1. A grass treatment apparatus which is adapted to be coupled with a propelling vehicle in order to be moveable over the ground and which mounts a plurality of grass treatment units which are engageable with the ground in order to carry out required grass treatment operations, said apparatus comprising:

a main frame having mountings by which the apparatus can be coupled with a propelling vehicle;

a grass treatment unit mounted on the main frame;

a side frame adjustably mounted on the main frame, and having a grass treatment unit mounted thereon;

a mounting recess provided in the main frame for receiving the side frame; and a power-operated device coupling the side frame to the main frame and operative to adjust the side frame between an outwardly deployed position in which it is laterally spaced from the main frame so that the treatment units can operate throughout an extended width provided by the main frame and the side frame lying one beside the other, and an inwardly deployed position in which the side frame is received by said mounting recess so that the treatment units are located one behind the other and operate throughout a reduced width provided by the main frame only.

2. Apparatus according to claim 1, in which two side frames are mounted on the main frame, one on either side thereof, when in the outwardly deployed position so as to form wing sections.

3. Apparatus according to claim 1, in which the power operated device comprises a piston/cylinder device.

4. Apparatus according to claim 3, in which the piston/cylinder device has a two part coupling with the side frame such that the side frame maintains a substantially horizontal attitude as it is adjusted between its two different operating positions.

5. Apparatus according to claim 4, in which the side frame is suspended by a substantially horizontal pivot which extends parallel to the direction of forward travel and which allows limited pivoting movement of the side frame about the pivot.

6. Apparatus according to claim 1, in which the grass treatment units take the form of brush units.

7. Apparatus according to claim 6, in which the brush units comprise longitudinal brush strips and/or parallel arrangements of brush heads having their axis extending obliquely of the direction of forward travel.

8. Apparatus according to claim 1, in which the grass treatment units take the form of roller units.

9. Apparatus according to claim 2, in which the grass treatment units take the form of brush units.

10. Apparatus according to claim 9, in which the brush units comprise longitudinal brush strips and/or parallel arrangements of brush heads having their axis extending obliquely of the direction of forward travel.

11. Apparatus according to claim 2, in which the grass treatment units take the form of roller units.

12. Apparatus according to claim 3, in which the grass treatment units take the form of brush units.

13. Apparatus according to claim 12, in which the brush units comprise longitudinal brush strips and/or parallel arrangements of brush heads having their axis extending obliquely of the direction of forward travel.

14. Apparatus according to claim 3, in which the grass treatment units take the form of roller units.

15. Apparatus according to claim 4, in which the grass treatment units take the form of brush units.

16. Apparatus according to claim 15, in which the brush units comprise longitudinal brush strips and/or parallel arrangements of brush heads having their axis extending obliquely of the direction of forward travel.

17. Apparatus according to claim 4, in which the grass treatment units take the form of roller units.

18. Apparatus according to claim 5, in which the grass treatment units take the form of brush units.

19. Apparatus according to claim 18, in which the brush units comprise longitudinal brush strips and/or parallel arrangements of brush heads having their axis extending obliquely of the direction of forward travel.

20. Apparatus according to claim 5, in which the grass treatment units take the form of roller units.

* * * * *